United States Patent Office 3,287,355
Patented Nov. 22, 1966

3,287,355
[3,2-b]PYRROL ANDROSTANES AND
PROCESS THEREFOR
Robert G. Christiansen, Schodack, N.Y., assignor to
Sterling Drug Inc., New York, N.Y., a corporation of
Delaware
No Drawing. Filed Nov. 21, 1962, Ser. No. 239,355
14 Claims. (Cl. 260—239.5)

This invention relates to new steroid compounds and in particular is concerned with steroido[3,2-b]pyrroles of the androstane series and a process for the preparation thereof, including novel intermediates.

The compounds of the invention are of the following structural formula:

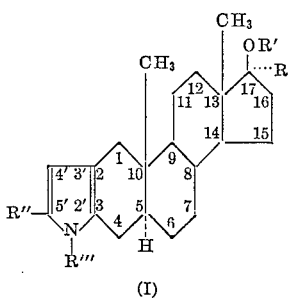

(I)

wherein R is hydrogen, lower-alkyl, lower-alkenyl or lower-alkynyl; R' is hydrogen or lower-carboxylic acyl; R'' is hydrogen or lower-alkyl; and R''' is hydrogen lower-alkyl or phenyl-lower-alkyl.

In the above formula I, the lower-alkyl groups, when present, in each instance have less than eight carbon atoms, and the lower-carboxylic acyl group, when present, has less than twelve carbon atoms. The latter is derived from hydrocarbon carboxylic acids which can be substituted by functional groups inert under the conditions of formation (i.e., esterification). Said lower-carboxylic acyl groups have a molecular weight less than about 200, and include such groups as lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenypropionyl, cinnamoyl, and the like; and monocarbocyclic aryloxy-lower-alkanoyl radicals, such as p-chlorophenoxyacetyl, and the like.

The compounds of the invention are prepared by condensing a steroid of the formula

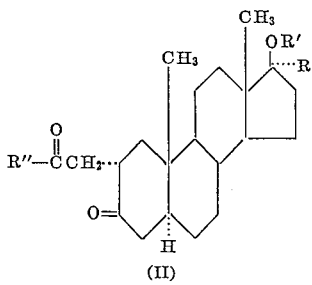

(II)

with a compound of the formula R'''NH₂. The reaction involves the elimination of two molecules of water and is preferably carried out by heating the reactants in an inert solvent in the presence of a trace of a salt of the amine R'''NH₂ with a strong acid with means of removing the water formed.

The compounds of Formula I where R''' is hydrogen can alternatively be prepared from the corresponding compounds of Formula I where R''' is benzyl by a reductive debenzylation process, as by catalytic hydrogenolysis or by treating the N-benzyl compound with lithium in liquid ammonia.

The compounds of Formula I where R' is a lower-carboxylic acyl group can be prepared from the corresponding 17β-hydroxy compounds by conventional esterification reactions using the appropriate acid anhydride or acid halide. The ester grouping may of course be present in the intermediate of Formula II prior to the condensation with R'''NH₂. In the case of compounds of Formula I where R''' is hydrogen, esterification may lead also to acylation of the nitrogen atom of the pyrrole ring. However, the N-acyl group can readily be removed by selective hydrolysis under mild conditions.

The intermediates of Formula II are also novel and within the purview of the invention. They are in turn prepared by heating a steroid 3-enamine, viz.:

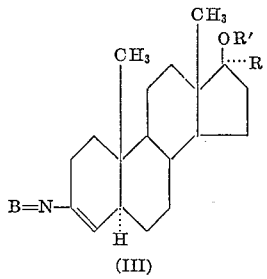

(III)

wherein B=N is the residue of a secondary amine, e.g., 1-pyrrolidyl, with the appropriate α-halo carbonyl compound, R''—CO—CH₂—X, wherein X is halogen, preferably chlorine or bromine. Alternatively, the intermediates of Formula II can be prepared by reacting an α-halo carbonyl compound, R''—CO—CH₂—X, with an alkali metal salt of a 2-hydroxymethylene-17α-R-androstan-17β-ol-3-one, followed by cleavage of the resulting 2-formyl-2-acylmethyl-steroid.

An alternative method for preparing intermediates of Formula II where R'' is hydrogen is by oxidative cleavage of a 2α-allyl-3-oxo steroid of the formula:

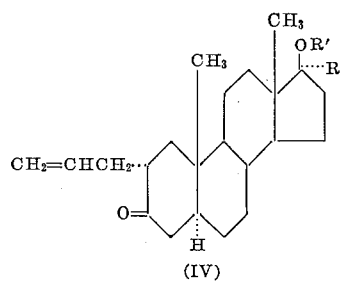

(IV)

The oxidative cleavage is carried out by ozonolysis or by means of osmium tetroxide-sodium metaperiodate.

The 2α-allyl-3-oxo compounds of Formula IV are in turn prepared by condensation of a steroid 3-enamine of Formula III with an allyl halide; or by reacting an allyl halide with an alkali metal salt of a 2-hydroxymethylene-17α-R-androstan-17β-ol-3-one, followed by cleavage of the formyl group from the resulting 2-formyl-2-allyl-steroid.

The structures of the compounds of the invention were established by the mode of synthesis, their ultraviolet and infrared spectra, and by the fact that the values found upon elementary analysis corresponded with the values calculated for the assigned structures.

The present invention has provided a new class of steroid compounds, and these compounds have now been made available for study as to their endocrinological properties. Endocrinological studies of the compounds of Formula I have shown that they possess useful metabolic and hormonal properties. In particular they have been found to exhibit such properties as anabolic, androgenic, uterotrophic and growth stimulating activities. The compounds can be prepared for use by dispersing them in an aqueous suspension or by dissolving them in a pharmacologically acceptable oil or oil-water emulsion for parenteral administration.

The following examples will further illustrate the invention without the latter being limited thereby.

EXAMPLE 1

(a) Androstan-17β-ol-3-one 3-pyrrolidine enamine

A solution of 43.5 g. of androstan-17β-ol-3-one and 32.0 g. of pyrrolidine in 500 ml. of benzene was refluxed under a water separator until no further water was removed (about one and one-half hours). The mixture was concentrated in vacuo, the residue was dissolved in 500 ml. of dry dimethylformamide, and a few ml. of liquid was distilled off to remove last traces of benzene and pyrrolidine.

(b) 2α-allylandrostan-17β-ol-3-one

Allyl bromide (85.0 g.) was added to the dimethylformamide solution of androstan-17β-ol-3-one 3-pyrrolidine enamine, obtained as described in part (a) above, and the mixture was heated on a steam bath for two hours. Water (100 ml.) was then added and heating continued for two hours longer. The reaction mixture was poured into 3 liters of cold water, and the aqueous suspension was extracted four times with 200 ml. of ether, and the ether extracts were washed with saturated sodium chloride solution and dried over anhydrous sodium sulfate and concentrated in vacuo. The residue was dissolved in methylene dichloride and chromatographed on a column of 1500 g. of silica gel. The column was eluted with methylene dichloride-ether (95:5) using 800 ml. fractions. The material obtained from fractions numbered 13–24 was recrystallized from aqueous ethanol and then from a hexane-acetone mixture to give 2α-allylandrostan-17β-ol-3-one in the form of colorless prisms, M.P. 118.0–119.0° C. (corr.), $[\alpha]_D^{25}=+13.6°$ (1% in chloroform); infrared absorption at 2.83, 5.82, 6.09, 10.65, 10.90, 11.05, 11.15 and 11.25μ.

An 0.33 g. sample of the compound obtained in the above example was heated with 0.5 g. of potassium hydroxide in 20 ml. of refluxing methanol for four hours. The product was recovered unchanged, indicating that the 2-allyl group had the α-configuration.

By replacing the androstan-17β-ol-3-one in the foregoing example by a molar equivalent amount of 17α-methylandrostan-17β-ol-3-one, 17α-vinylandrostan-17β-ol-3-one or 17α-ethynyl-androstan-17β-ol-3-one, there can be obtained, respectively, 2α-allyl-17α-methylandrostan-17β-ol-3-one, 2α-allyl-17α-vinyl-androstan-17β-ol-3-one or 2α-allyl-17α-ethynylandrostan-17β-ol-3-one.

2α-allylandrostan-17β-ol-3-one was also prepared as follows: A mixture of 3.18 g. of 2-hydroxymethylene-androstan-17β-ol-3-one and 0.30 g. of sodium hydride in 20 ml. of dimethylformamide was stirred under nitrogen for 30 minutes. Allyl bromide (1.51 g.) was then added and the reaction mixture stirred for one hour on a steam bath. A solution of 2.0 g. of potassium hydroxide in 5 ml. of water was added and the mixture stirred for one hour on a steam bath. Methylene dichloride (50 ml.) was added, followed by careful addition of 300 ml. of water. The reaction mixture was extracted with methylene dichloride, and the methylene dichloride extracts were washed with water, dried over anhydrous sodium sulfate and chromatographed on a column of 200 g. of silica gel. The column was eluted with pentane-ether (80:20) and the crystalline fractions combined and recrystallized from ether-hexane to give 2α-allylandrostan-17β-ol-3-one, M.P. 118–119° C.

EXAMPLE 2

17β-acetoxy-2α-allylandrostan-3-one

A mixture of 4.20 g. of 2α-allylandrostan-17β-ol-3-one (Example 1), 20 ml. of acetic anhydride and 40 ml. of pyridine was heated on a steam bath for thirty minutes. The reaction mixture was poured into ice water, and the solid product was collected by filtration, washed with water and dried. The product was recrystallized three times from the hexane to give 17β-acetoxy-2α-allylandrostan-3-one in the form of colorless prisms, M.P. 129.0–129.8° C. (corr.), $[\alpha]_D^{25}=+4.8°$ (1% in chloroform); infrared absorption at 5.76, 5.83, 6.10, 10.83 and 11.07μ.

EXAMPLE 3

17β-acetoxy-2α-formylmethylandrostan-3-one

A solution of 1.00 g. of 17β-acetoxy-2α-allylandrostan-3-one (Example 2) and 0.25 ml. of pyridine in 100 ml. of ethyl acetate was cooled to 2–5° C. and treated for 18.8 minutes with a stream of ozone (5.38 millimoles). The solution was then placed in a hydrogenation apparatus together with 0.10 g. of palladium hydroxide on strontium carbonate catalyst and shaken for forty-five minutes in an atomosphere of hydrogen at 30 lbs. per sq. inch. The catalyst was removed by filtration and the filtrate concentrated on a steam bath in vacuo. The residue was dissolved in methylene dichloride and chromatographed on a column of 50 g. of silica gel. The column was eluted with pentane-ether (80:20) and the crystalline fractions were recrystallized three times from ether-hexane to give 17β-acetoxy-2α-formylmethylandrostan-3-one in the form of beige needles, M.P. 173.2–174.5° C. (corr.), $[\alpha]_D^{25}=+6.5°$ (1% in chloroform).

When measured by its effect upon the growth of the levator ani muscle in the rat, 17β-acetoxy-2α-formylmethylandrostan-3-one was found to possess myotrophic activity with a low degree of androgenicity when administered subcutaneously at a dose level of 11.2 mg./kg./day.

By replacing the 17β-acetoxy-2α-allylandrostan-3-one in the foregoing example by a molar equivalent amount of 2α-allyl-17α-methylandrostan-17β-ol-3-one, 2α-allyl-17α-vinylandrostan-17β-ol-3-one or 2α-allyl-17α-ethynyl-androstan-17β-ol-3-one there can be obtained, respectively, 2α-formylmethyl-17α-methylandrostan-17β-ol-3-one, 2α-formylmethyl-17α-vinylandrostan-17β-ol-3-one or 2α-formylmethyl-17α-ethynylandrostan-17β-ol-3-one.

The 17β-acetoxy-2α-formylmethylandrostan-3-one obtained in Example 3 above can be saponified by heating it with a solution of potassium hydroxide in methanol to give 2α-formylmethylandrostan-17β-ol-3-one.

EXAMPLE 4

2α-acetonylandrostan-17β-ol-3-one

Androstan-17β-ol-3-one (5.81 g.) and 7.11 g. of pyrrolidine in 100 ml. of benzene was caused to react to produce androstan-17β-ol-3-one 3-pyrrolidine enamine as described in Example 1, part (a). To a solution of the resulting enamine in 100 ml. of dimethylformamide was added 5.48 g. of bromoacetone, and the mixture was heated for ninety minutes on a steam bath. Water (10 ml.) was then added, and the mixture was heated for one hour and then allowed to stand at room temperature for about fifteen hours. The reaction mixture was shaken with water and methylene dichloride, and the methylene dichloride layer was separated and washed with water, dried over anhydrous sodium sulfate, filtered and chromatographed directly on a column of 350 g. of silica gel. The column was eluted successively with pentane-ether (70:30) (fifteen 800 ml. fractions), pentane-ether (65:35) (fifteen fractions), pentane-ether (60:40) (ten fractions) and pentane-ether (50:50) (thirteen fractions). The last two eluant mixtures brought out the desired product which was recrystallized from methylene dichloride-ethyl acetate to give 2α-acetonylandrostan-17β-ol-3-one in the form of colorless needles, M.P. 176.4–177.6° C. (corr.), $[\alpha]_D^{25} = -2.0°$ (1% in chloroform). The infrared spectrum confirmed the presence of two carbonyl groups.

By replacing the bromoacetone in the foregoing example by a molar equivalent amount of 1-bromo-2-butanone or 1-bromo-2-pentanone there can be obtained, respectively, 2α-(2-oxobutyl)androstan-17β-ol-3-one or 2α-(2-oxopentyl)androstan-17β-ol-3-one.

By replacing the androstan-17β-ol-3-one in the foregoing example by a molar equivalent amount of 17α-methylandrostan-17β-ol-3-one there can be obtained 2α-acetonyl-17α-methylandrostan-17β-ol-3one.

Alternatively, 2α-acetonylandrostan-17β-ol-3-one can be prepared by treating the sodium salt of 2-hydroxymethyleneandrostan-17β-ol-3-one with bromoacetone by the procedure described above under Example 1 for the reaction of 2-hydroxymethyleneandrostan-17β-ol-3-one with allyl bromide.

EXAMPLE 5

*17β-acetoxyandrostano[3,2-b]-1'-benzylpyrrole [I; R is H, R' is COCH₃, R" is H, R''' is CH₂C₆H₅]*

A mixture of 2.00 g. of 17β-acetoxy-2α-formylmethylandrostan-3-one (Example 3), 1.18 ml. of benzylamine, 0.10 g. of p-toluenesulfonic acid monohydrate and 50 ml. of benzene was refluxed for two hours under a water separator. The reaction mixture was washed with 5% hydrochloric acid, water and saturated sodium bicarbonate solution, dried over anhydrous sodium sulfate and concentrated in vacuo. The residue was recrystallized twice from a methylene dichloride-methanol mixture to give 17β-acetoxyandrostano[3,2-b]-1'-benzylpyrrole in the form of colorless needles, M.P. 187.6–188.8° C. (corr.), $[\alpha]_D^{25} = +54.1°$ (1% in chloroform).

17β-acetoxyandrostano[3,2-b]-1'-benzylpyrrole showed a uterotrophic response when administered subcutaneously to female rats at a dose level of 10.0 mg./kg./day.

By replacing the 17β-acetoxy-2α-formylmethylandrostan-3-one in the foregoing example by a molar equivalent amount of 2α-formylmethyl-17α-methylandrostan-17β-ol-3-one, 2α-formylmethyl-17α-vinylandrostan-17β-ol-3-one or 2α - formylmethyl-17α-ethynylandrostan-17β-ol-3-one there can be obtained, respectively, 17β-hydroxy-17α-methylandrostano[3,2-b]-1'-benzylpyrrole [I; R is CH₃, R' is H, R''' is CH₂C₆H₅], 17β-hydroxy-17α-vinylandrostano[3,2-b]-1'-benzylpyrrole [I; R is CH=CH₂, R' is H, R" is H, R''' is CH₂C₆H₅] or 17β-hydroxy-17α-ethynylandrostano[3,2-b]-1'-benzylpyrrole [I; R is C≡CH, R' is H, R" is H, R''' is CH₂C₆H₅].

By replacing the benzylamine in the foregoing example by a molar equivalent amount of methylamine, n-butylamine or 2-phenylethylamine there can be obtained, respectively, 17β-acetoxyandrostano[3,2-b]-1'-methylpyrrole [I; R is H, R' is COCH₃, R" is H, R''' is CH₃], 17β-acetoxyandrostano[3,2-b]-1'-(n-butyl)pyrrole [I; R is H, R' is COCH₃, R" is H, R''' is (CH₂)₃CH₃], or 17β-acetoxyandrostano[3,2-b]-1'-(2-phenylethyl)pyrrole [I; R is H, R' is COCH₃, R" is H, R''' is CH₂CH₂C₆H₅].

EXAMPLE 6

*17β-hydroxyandrostano[3,2-b]-1'-benzyl-5'-methylpyrrole [I; R and R' are H, R" is CH₃, R''' is CH₂C₆H₅]*

A mixture of 1.00 g. of 2α-acetonylandrostan-17β-ol-3-one (Example 4), 1.00 g. of benzylamine and 50 ml. of benzene was refluxed for three hours under a water separator. There was then added 10–20 mg. of p-toluenesulfonic acid and the mixture was refluxed for two hours longer. The reaction mixture was cooled to room temperature, filtered and the filtrate washed with 10% hydrochloric acid and water, dried over anhydrous sodium sulfate and concentrated in vacuo. The residue was dissolved in methylene dichloride, filtered, ethyl acetate added and the solution concentrated to a volume of 5 ml. The product which separated was collected and recrystallized from a methylene dichloride-ethyl acetate mixture to give 17β-hydroxyandrostano[3,2-b]-1'-benzyl-5'-methylpyrrole, M.P. (evacuated) 205–209° C. (uncorr.); infrared absorption at 2.80, 2.90, 3.45, 3.50, 5.15, 5.76, 6.24, 6.57, 6.68, 6.88, 6.97, 13.57 and 14.45μ.

By replacing the 2α-acetonylandrostan-17β-ol-3-one in the foregoing example by a molar equivalent amount of 2α-(2-oxobutyl)androstan-17β-ol-3-one, 2α-(2-oxopentyl)androstan-17β-ol-3-one or 2α-acetonyl-17α-methylandrostan-17β-ol-3-one there can be obtained, respectively, 17β-hydroxyandrostano[3,2-b]-1'-benzyl-5'-ethylpyrrole [I; R and R' are H, R" is C₂H₅, R''' is CH₂C₆H₅], 17β-hydroxyandrostano[3,2-b]-1'-benzyl-5'-propylpyrrole [I; R and R' are H, R" is CH₃CH₂CH₂, R''' is CH₂C₆H₅] or 17β-hydroxy - 17α-methylandrostano[3,2-b]-1'-benzyl-5'-methylpyrrole [I; R is CH₃, R' is H, R" is CH₃, R''' is CH₂C₆H₅].

17β - hydroxyandrostano[3,2-b] - 1'-benzyl-5'-methylpyrrole can be caused to react with acetic anhydride, butyric anhydride, octanoyl chloride, succinic anhydride, β-cyclopentylpropionyl chloride, benzoyl chloride, 3,4,5-trimethoxybenzoyl chloride, phenylacetyl chloride, cinnamoyl chloride or p-chlorophenoxyacetyl chloride, in the presence of pyridine, to give, respectively, 17β-acetoxyandrostano[3,2-b]pyrrole, 17β-butryloxyandrostano[3,2-b]pyrrole, 17β-octanoyloxyandrostano[3,2-b]pyrrole, 17β-(β-carboxypropionoxy)androstano[3,2-b]pyrrole, 17β-(β-cyclopentylpropionoxy)androstano[3,2-b]pyrrole, 17β-benzoyloxyandrostano[3,2-b]pyrrole, 17β-(3,4,5-trimethoxybenzoyloxy)androstano[3,2-b]pyrrole, 17β-phenylacetoxyandrostano[3,2-b]pyrrole, 17β-cinnamoyloxyandrostano-[3,2-b]pyrrole or 17β-(p-chlorophenoxyacetoxy)androstano[3,2-b]pyrrole.

EXAMPLE 7

*17β-hydroxyandrostano[3,2-b]pyrrole [pyrrolo(3',2'-2,3)androstan-17β-ol] [I; R, R', R" and R''' are H]*

Lithium (0.56 g.) was added in small pieces to a refluxing mixture of 1.84 g. of 17β-acetoxyandrostano[3,2-b]-1'-benzylpyrrole (Example 5) in 10 ml. of tetrahydrofuran and 40 ml. of liquid ammonia. The mixture was allowed to reflux for one hour and then 5 g. of ammonium chloride was added in small portions. The mixture was stirred while the ammonia was allowed to evaporate, and then 200 ml. of distilled water was added. The solid product was collected by filtration, washed with water, dissolved in 30 ml. of methylene dichloride and filtered. To the filtrate was added 15 ml. of methanol and the solution was concentrated to 10 ml. The product which separated after chilling was collected and recrystallized from a methylene dichloride-methanol mixture to give 17β-hydroxyandrostano[3,2-b]pyrrole [pyrrolo(3',2'-2,3) androstan-17β-ol] in the form of pale peach colored crystals, M.P. 243.0–243.8° C. (corr.), $[\alpha]_D^{25} = +62.4°$ (1% in chloroform); infrared absorption at 2.85, 3.00, 3.46, 3.54, 6.15, 6.30, 6.43, 6.57 and 6.93μ.

17β - hydroxyandrostano[3,2-b]pyrrole [pyrrolo(3',2'-2,3)-androstan-17β-ol] showed growth stimulation when administered subcutaneously to female rats.

By replacing the 17β-acetoxyandrostano[3,2-b]-1'-benzylpyrrole in the foregoing example by a molar equivalent amount of 17β-hydroxy-17α-methylandrostano[3,2-b]-1'-benzylpyrrole, 17β-hydroxy-17α-vinylandrostano[3,2-b]-1'-benzylpyrrole, 17β-hydroxy-17α-ethnylandrostano[3,2-b] - 1'-benzylpyrrole, 17β-hydroxyandrostano[3,2-b]-1'-benzyl-5'-ethylpyrrole, 17β-hydroxyandrostano[3,2-b]-1'- benzyl-5'-propylpyrrole or 17β-hydroxy-17α-methylandrostano[3,2-b]-1'-benzyl-5'-methylpyrrole, there can be obtained, respectively, 17β-hydroxy-17α-methylandrostano [3,2-b]pyrrole [I; R is $CH_3$, R', R" and R''' are H], 17β-hydroxy - 17α-vinylandrostano[3,2-b]pyrrole [I; R is $CH=CH_2$, R', R" and R''' are H], 17β-hydroxy-17α-ethynylandrostano[3,2-b]pyrrole [I; R is $C\equiv CH$, R', R" and R''' are H], 17β-hydroxyandrostano[3,2-b]-5'-ethylpyrrole [I; R and R' are H, R" is $C_2H_5$, R''' is H], 17β-hydroxyandrostano[3,2-b]-5'-propylpyrrole [I; R and R' are H, R" is $CH_2CH_2CH_3$, R''' is H], or 17β-hydroxy-17α-methylandrostano[3,2-b]-5'-methylpyrrole [I; R is $CH_3$, R' is H, R" is $CH_3$, R''' is H].

I claim:
1. A compound of the following formula

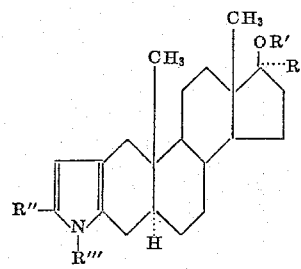

wherein R is selected from the group consisting of hydrogen, lower-alkyl, lower-alkenyl and lower-alkynyl; R' is selected from the group consisting of hydrogen and lower-carboxylic acyl; R" is selected from the group consisting of hydrogen and lower-alkyl; and R''' is selected from the group consisting of hydrogen, lower-alkyl and phenyl-lower-alkyl.

2. Pyrrolo(3',2'-2,3)androstan-17β-ol.
3. 17β-acetoxyandrostano[3,2-b]-1'-benzylpyrrole.
4. 17β-hydroxyandrostano[3,2-b]-1'-benzyl-5'-methylpyrrole.
5. The process for preparing a compound of the formula

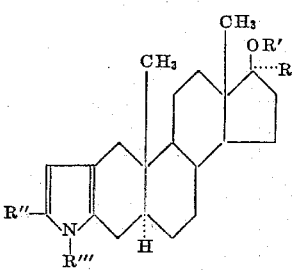

which comprises reacting a compound of the formula

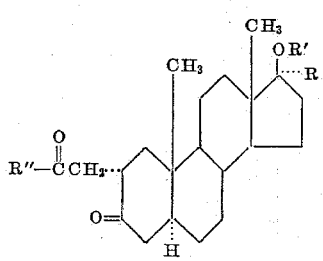

with a compound of the formula R'''$NH_2$, wherein R is selected from the group consisting of hydrogen, lower-alkyl, lower-alkenyl and lower-alkynyl; R' is selected from the group consisting of hydrogen and lower-carboxylic acyl; R" is selected from the group consisting of hydrogen and lower-alkyl; and R''' is selected from the group consisting of hydrogen, lower-alkyl and phenyl-lower-alkyl.

6. A compound of the formula

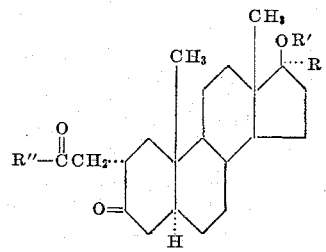

wherein R is selected from the group consisting of hydrogen, lower-alkyl, lower-alkenyl and lower-alkynyl; R' is selected from the group consisting of hydrogen and lower-carboxylic acyl; and R" is selected from the group consisting of hydrogen and lower-alkyl.

7. 17β-acetoxy-2α-formylmethylandrostan-3-one.
8. 2α-formylmethylandrostan-17β-ol-3-one.
9. 2α-acetonylandrostan-17β-ol-3-one.
10. A compound of the formula

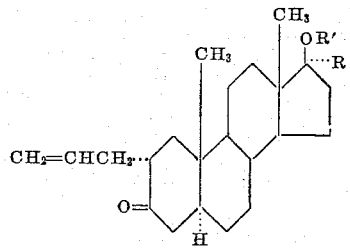

wherein R is selected from the group consisting of hydrogen, lower-alkyl, lower-alkenyl and lower-alkynyl; and R' is selected from the group consisting of hydrogen and lower-carboxylic acyl.

11. 2α-allylandrostan-17β-ol-3-one.
12. 17β-acetoxy-2α-allylandrostan-3-one.
13. The process which comprises reacting a compound of the formula

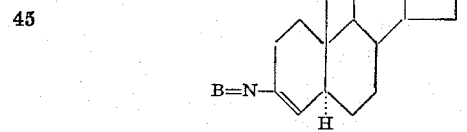

wherein R is selected from the group consisting of hydrogen, lower-alkyl, lower-alkenyl and lower-alkynyl; R' is selected from the group consisting of hydrogen and lower-carboxylic acyl; and B=N is the residue of a secondary amine, with a compound selected from the group consisting of allyl halides and R"—CO—$CH_2$—X, wherein R" is selected from the group consisting of hydrogen and lower-alkyl, and X is halogen.

14. The process which comprises reacting an alkali metal salt of a 2-hydroxymethylene-17α-R-androstan-17β-ol-3-one, wherein R is selected from the group consisting of hydrogen, lower-alkyl, lower-alkenyl and lower-alkynyl, with a compound selected from the group consisting of allyl halides and R"—CO—$CH_2$—X, wherein R" is selected from the group consisting of hydrogen and lower-alkyl, and X is halogen.

References Cited by the Examiner
UNITED STATES PATENTS
3,032,551  5/1962  Orr _____ 260—239.5

LEWIS GOTTS, *Primary Examiner.*

IRVING MARCUS, *Examiner.*

H. A. FRENCH, *Assistant Examiner.*